United States Patent [19]

Sato

[11] Patent Number: 4,887,842
[45] Date of Patent: Dec. 19, 1989

[54] GAS BAG

[75] Inventor: Koki Sato, Aichi, Japan

[73] Assignee: Kabushiki Kaisha Tokai-Rika-Denki-Seisakusho, Niwa, Japan

[21] Appl. No.: 231,267

[22] Filed: Aug. 12, 1988

[30] Foreign Application Priority Data

Aug. 17, 1987 [JP] Japan .............................. 62-124863[U]

[51] Int. Cl.$^4$ ............................................. B60R 21/08
[52] U.S. Cl. ....................................... 280/730; 280/731; 280/743
[58] Field of Search ............... 280/728, 729, 730, 731, 280/732, 743

[56] References Cited

U.S. PATENT DOCUMENTS 4,111,458 9/1978 Okada et al. ..................... 280/739
4,300,894 11/1981 Cumming et al. ................. 280/729

FOREIGN PATENT DOCUMENTS 51-31658 9/1976 Japan .
55-35242 8/1980 Japan .
56-10591 3/1981 Japan .
57-167847 10/1982 Japan .

Primary Examiner—Kenneth R. Rice
Attorney, Agent, or Firm—Sixbey, Friedman, Leedom & Ferguson

[57] ABSTRACT

A gas bag interposed between an occupant and a vehicle while inflating the gas bag. Longitudinally opposite end portions of at least one strap are retained on a body of the gas bag and an intermediate portion of the strap is threaded through a plurality of through-holes formed in the bag body so as to maintain a predetermined configuration of the bag body during inflation thereof. Accordingly, the installation of the strap on the bag body is facilitated.

19 Claims, 2 Drawing Sheets

GAS BAG

BACKGROUND OF THE INVENTION

1. Field of the Invention:

The present invention relates to a gas bag which is interposed between an occupant of a vehicle and the structure of the vehicle or a part thereof by being inflated at the time of an emergency.

2. Description of the Related Art:

Conventionally, a gas bag is used which is adapted to be inflated between an occupant of a vehicle and the structure of the vehicle or a part thereof when necessary such as during an emergency.

This gas bag is arranged such that a gas is injected into it from a gas generator, when necessary, so as to be inflated. Straps are provided to the gas bag in such a manner as to stretch between opposing portions of the gas bag to allow the configuration of the gas bag to be maintained in a predetermined state when it is inflated.

A flexible material such as the one used for an occupant-restraining webbing may be employed for the straps, and opposite ends thereof may be respectively sewn to opposing portions of the gas bag.

However, since a large load is applied to these straps during inflation of the gas bag, it is necessary to strengthen end portions of the straps that are secured to the gas bag. Generally, a sewn structure is adopted in installing the straps, so that a sewing thread is used. Hence, portions of the straps sewn so as to firmly secure the opposite ends of the straps increase in number. Consequently, there have been disadvantages in that the gas bag, when folded, has a drawback of becoming thick, and that a long period is required in the sewing operation.

SUMMARY OF THE INVENTION

Accordingly, an object of the present invention is to provide a gas bag which facilitates the installation of straps for maintaining the gas bag in a predetermined inflated configuration thereof.

To this end, according to the present invention, there is provided a gas bag interposed between an occupant of a vehicle and a chassis or a body of the vehicle during inflation of the gas bag, comprising: a bag-shaped bag body adapted to be inflated by a gas; and at least one strap whose longitudinally opposite end portions are retained by the bag body and a portion of whose intermediate portion is threaded through a plurality of through-holes formed in the bag body, portions of the strap formed between the portion of the intermediate portion and each of the opposite end portions respectively being disposed inside the bag body so as to restrict an amount of inflation of the bag body.

Therefore, according to the present invention, it suffices if the opposite end portions of the straps are merely retained at one side of the gas bag body. In addition, since the intermediate portions of the straps are respectively inserted through the through-holes of the gas bag body, there is no need to sew these inserted portions to the gas bag body, and the inflated configuration of the gas bag body and the amount of inflation thereof can be maintained positively by a simple arrangement.

DESCRIPTION OF THE PREFERRED EMBODIMENT

Figure 1:
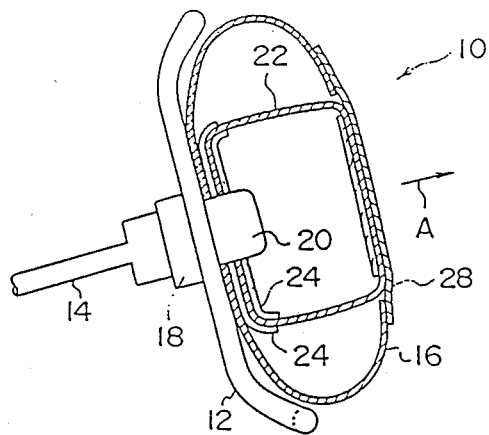
FIG. 1 is a cross-sectional view taken along the shaft of a steering column, illustrating an embodiment of a gas bag in accordance with the present invention.

FIG. 1 illustrates a state in which a gas bag 10 in accordance with the present invention is inflated after being installed on a steering wheel 12. This steering wheel 12 is secured to a distal end portion of a steering column 14. The arrangement is such that, as the steering wheel 12 is rotated, the direction of travel of a vehicle can be changed via a gear box provided at a distal end portion (not shown) of the steering column 14.

A gas bag body 16 of the gas bag 10 is formed into a bag shape, and an inlet portion or an opening portion thereof is retained at a hub 18 of the steering wheel 12. A gas generator 20 is located in the inlet portion of this bag body 16 in such a manner as to extend from the hub 18, and the gas bag is adapted to inflated by a gas generated by the gas generator 20 during an emergency.

Figure 2:
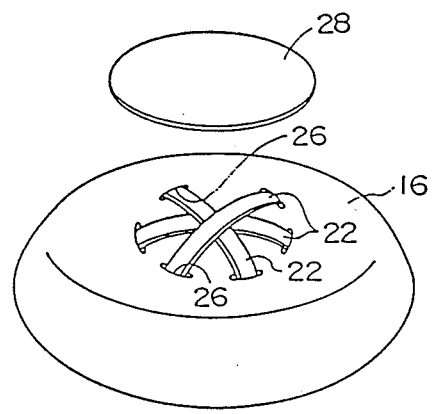
FIG. 2 is an exploded perspective view illustrating an essential portion of FIG. 1.

Opposite end portions of a multiplicity of strap belts 22 are sewn to the inlet portion of the bag body 16 together with reinforcements 24 made of cloth. As shown in FIG. 2, these strap belts 22 are arranged such that an intermediate portions thereof respectively project outwardly of the bag body 16 through throughholes 26 formed in the bag body 16, are then inserted back into the bag body 16 through the through holes 26 and are retained at the hub 18.

In this embodiment shown in FIG. 2, three strap belts 22 are used, and the intermediate portions thereof are respectively exposed to the outside of the bag body 16 by projecting from the through-holes 26.

By virtue of this arrangement, the strap belts 22 are capable of restricting the amount of inflation of the bag body 16 in the direction of an occupant in a direction of an arrow head A when the bag body 16 is inflated, as shown in FIG. 1, thereby maintaining the bag body 16 in a predetermined configuration.

A disk-shaped flexible cover 28 is provided on the bag body 16 on the side of the occupant. A rubber sheet, cloth, or the like is used for this cover 28, and a peripheral edge portion thereof is secured to the bag body 16 by means of vulcanization bonding or a similar method. In this case, the cover 28 is preferably secured to the bag body 16 in such a manner as to cover all the through-holes 26. This arrangement makes it possible to prevent the gas inside the bag body 16 from leaking to a vehicle compartment through the through-holes 26.

The operation of this embodiment will be described hereafter.

The bag body 16, together with the strap belts 22, is installed on the steering wheel 12 in a folded state. In this installed state, the cover covering the bag body 16 is preferably installed to the steering wheel 12. Since the intermediate portions of the strap belts 22 are not sewn to the bag body 16, the thickness of the bag body 16 in the folded state does not become great.

At the time of a vehicular emergency, the gas generator 20 supplies a large amount of gas into the bag body 16. Consequently, the bag body is inflated, as shown in FIG. 1, to be interposed between the structure of the vehicle and the occupant, thereby absorbing an impact when the occupant collides against the bag body 16.

The strap belts 22 are arranged in such a manner that the configuration of the bag body 16 is maintained in a predetermined configuration during the inflation of the bag body 16 so as to facilitate the absorption of the impact exerted by the occupant. In addition, the gas supplied to the bag body 16 begins to leak through the through-holes 26, but, since the cover 28 prevents the leaking gas from escaping into the compartment, the inflated gas can be effectively utilized in the inflation of the bag body 16.

As for the strap belts 22, large forces act on reinforcing portions thereof constituted by the reinforcements 24, so that the portions of the strap belts 22 to be installed on the reinforcements 24 and the hub must be produced to provide a sufficient strength. However, since there is no need to secure the intermediate portions of the strap belts 22, the strap belts 22 can be produced simply.

Figure 3:
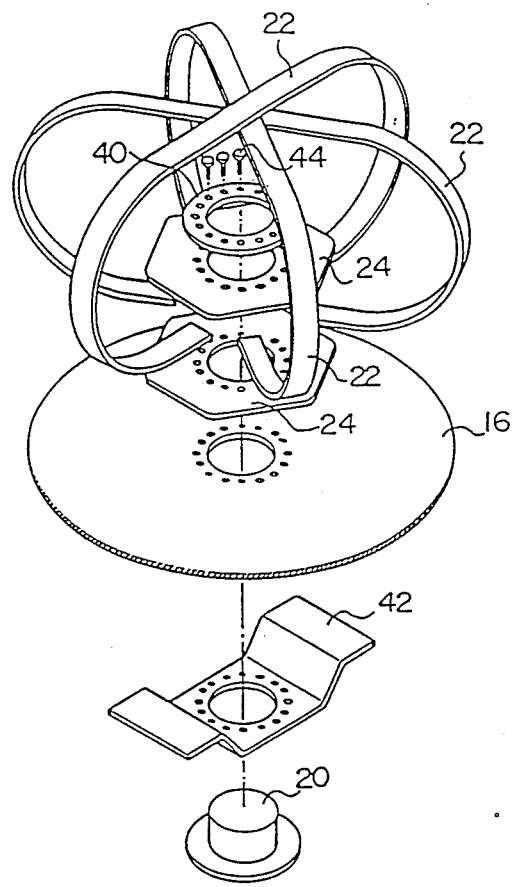
FIG. 3 is an exploded perspective view illustrating how straps are installed.

FIG. 3 shows an arrangement for firmly securing the bag body 16 and the strap belts 22.

The opposite end portions of the three strap belts 22 are sewn to the reinforcement 24 disposed between the strap belts 22 and the bag body 16. Then, the other reinforcement 24 and the inlet portion of the bag body 16 are superposed on this assembly, and the superposed assembly is clamped by a fixing ring 40 and a baseplate 42 and is secured by means of rivets 44. Consequently, the strap belts 22 and the baseplate 42 are fixed to each other via reinforcements 24. In addition, the baseplate 42 is fixed to the spokes or hub of the steering wheel 12.

Although, in this embodiment, a description has been given of an example in which each of the straps is threaded through two through-holes, the present invention is not restricted to this arrangement, and each of the straps may be inserted through four, six, or another even number of through-holes.

As described above, since the gas bag interposed between the passenger and the structure of the vehicle is provided with a bag body for inflation, straps whose opposite end portions are retained at one side of the bag body and whose intermediate portions are respectively inserted into through-holes formed in the bag body to restrict an amount of inflation of the bag body, and a cover which is installed on the bag body and covers the through-holes, the present invention produces an excellent advantage in that the inflated configuration of the bag body can be positively maintained to a predetermined shape by means of a simple arrangement.

What is claimed is:

1. A gas bag interposed between an occupant and a vehicle during inflation of said gas bag, comprising:
   a bag body for being inflated by a gas;
   at least one strap for retaining longitudinally opposite end portions of said bag body, with a part of an intermediate portion thereof being threaded through a plurality of through-holes formed in said bag body, and a cover provided on an outer surface of said bag body and adapted to cover said through-holes, wherein portions of said strap between said part of said intermediate portion and each of said opposite end portions respectively being disposed inside said bag body so as to restrict an amount of inflation of said bag body.

2. A gas bag according to claim 1, wherein said cover is mounted on said bag body for covering said part of said intermediate portion.

3. A gas bag according to claim 1, wherein a peripheral edge portion of said cover is secured to said bag body.

4. A gas bag according to claim 3, wherein said peripheral portion of said cover is bonded to said gas bag by vulcanization.

5. A gas bag according to claim 1, wherein said cover is made from a rubber sheet or cloth.

6. A gas bag according to claim 1, wherein said cover is made from a disk-shaped flexible material.

7. A gas bag according to claim 1, wherein said opposite end portions of said strap are secured to said bag body through at least one reinforcement.

8. A gas bag according to claim 7, wherein said bag body is provided with an opening in which a gas generator for generating said gas is inserted, and said opposite end portions of said strap and said reinforcement are sewn to a peripheral edge portion of said opening.

9. A gas bag according to claim 8, wherein said peripheral portion of said bag body is secured to a vehicle structure.

10. A gas bag according to claim 1, wherein a number of said plural through-holes is an even number.

11. A gas bag according to claim 1, wherein a plurality of said straps are symmetrically arranged on said bag body with each other.

12. A gas bag interposed between an occupant of a vehicle and a vehicle structure while inflating thereof, comprising:
    a bag body having an opening inserted a gas generator for generating a gas to inflate said bag body by said gas; and
    at least one strap arranged to penetrate a longitudinally opposite end portion from an inside of said bag body through a plurality of through-holes formed in said bag body and to reach the inside of said bag body, and longitudinally opposite end portions thereof being retained at a peripheral edge portion of an opening in said bag body so as to restrict an amount of inflation of said bag body.

13. A gas bag according to claim 12, further comprising a cover provided on an outer surface of said bag body and adapted to cover said through-holes.

14. A gas bag according to claim 12, wherein said cover is arranged in such a manner as to cover each part of said strap located on an outside of said bag body, and of said bag body.

15. A gas bag according to claim 14, wherein a peripheral edge portion of said cover is secured to said bag body.

16. A gas bag according to claim 13, wherein said opposite end portions of said strap are sewn to said peripheral edge portion of said opening in said bag body through at least one reinforcement interposed between said bag body and said strap.

17. A gas bag according to 16, wherein said peripheral edge portion of said opening of said bag body is secured to a body of the vehicle.

18. A gas bag according to claim 13, wherein a number of said plural through-holes is an even number.

19. A gas bag according to claim 13, wherein a plurality of said straps are symmetrically arranged on said bag body with each other.

* * * * *